United States Patent [19]
Matsuo

[11] Patent Number: 5,599,756
[45] Date of Patent: Feb. 4, 1997

[54] SINTERED HIGH-TOUGHNESS ALUMINA-BASED COMPOSITE BODY

[75] Inventor: Youji Matsuo, Kurobe, Japan

[73] Assignee: Yoshida Kogyo K.K., Tokyo, Japan

[21] Appl. No.: 418,478

[22] Filed: Apr. 7, 1995

Related U.S. Application Data

[62] Division of Ser. No. 153,989, Nov. 18, 1993, Pat. No. 5,432,133.

[30] Foreign Application Priority Data

Nov. 19, 1992 [JP] Japan ................... 4-310114

[51] Int. Cl.⁶ ................................... C04B 35/10
[52] U.S. Cl. ........................................ 501/127
[58] Field of Search ................... 501/120, 125, 501/127, 105, 153

[56] References Cited

U.S. PATENT DOCUMENTS

| | | |
|---|---|---|
| 4,306,909 | 12/1981 | Oda et al. . |
| 4,316,964 | 2/1982 | Lange . |
| 4,430,440 | 2/1984 | Wada et al. . |
| 4,892,850 | 1/1990 | Hori et al. . |
| 5,002,911 | 3/1991 | Matsumoto et al. ............... 501/127 X |
| 5,134,100 | 7/1992 | Freudenderg et al. . |
| 5,135,896 | 8/1992 | Vezza . |
| 5,204,300 | 4/1993 | Kumagai et al. . |
| 5,403,795 | 4/1995 | Koyama et al. ..................... 501/127 |

FOREIGN PATENT DOCUMENTS

| | | |
|---|---|---|
| 20291/76 | 6/1976 | Australia . |
| 10460987 | 5/1991 | European Pat. Off. . |
| 13737839 | 11/1987 | Germany . |

*Primary Examiner*—Karl Group
*Attorney, Agent, or Firm*—Finnegan, Henderson, Farabow, Garrett & Dunner, L.L.P.

[57] ABSTRACT

A sintered high-toughness alumina-based composite body consisting essentially of a plate- or rod-shaped corundum or alumina-based compound structure, a fine granular corundum structure, and inevitable impurities.

2 Claims, 6 Drawing Sheets

SINTERED HIGH-TOUGHNESS ALUMINA-BASED COMPOSITE BODY

This is a division of application Ser. No. 08/153,989, filed Nov. 18, 1993, now U.S. Pat. No. 5,432,133.

BACKGROUND OF THE INVENTION

1. Field of the Invention

This invention relates to a sintered alumina-based composite body having high strength and high toughness and also to a process for producing such a sintered, high-strength and high-toughness, alumina-based composite body by controlling its structure.

2. Description of the Prior Art

Addition of various whiskers, fibers or the like is generally practiced to obtain ceramic materials having high strength and high toughness. When a sintered composite body is obtained by adding whiskers, fibers or the like to a raw batch and then firing the resultant mix, it is however difficult to obtain the sintered composite body in a densified form, that is, to impart high strength and high toughness to the sintered composite body.

Japanese Patent Application Laid-Open (Kokai) No. 62-72522 and Japanese Patent Publication (Kokoku) No. 4-24305, on the other hand, disclose a composite alumina-titania powder and a sintered corundum-rutile composite body composed of a corundum-phase alumina and a rutile-phase titania. Sintered bodies of the above composite powder and the sintered composite bodies show higher toughness compared with sintered bodies formed of a single corundum-alumina phase.

The sintered corundum-titania bodies disclosed in the above publications are however accompanied by the problems that temperature control is difficult upon sintering and, when the temperature is raised in an attempt to achieve further densification of the sintered bodies, the whole structure is converted to a plate-like or rod-like structure and no higher toughness cannot be achieved.

According to the above production process, a sintered body of a mixed structure is produced by first preparing a mixture of uniformly dispersed alumina and additives, forming (shaping) the mixture into a green body and then firing the green body. The above production process is therefore accompanied by the problem that free control of the structure can hardly be achieved.

SUMMARY OF THE INVENTION

A first object of the present invention is therefore to provide a sintered alumina-based composite body having high density, high strength and high toughness.

A second object of the present invention is to provide a process for the production of a sintered alumina-based composite body, which process permits free control of the structure of the composite body so that the composite body can be provided with the above-described excellent properties by the control of its structure.

In one aspect of the present invention, there is thus provided a sintered high-toughness alumina-based composite body of a structure, which comprises: a plate-like or rod-like, corundum or alumina-based compound structure, a fine granular corundum structure, and inevitable impurities. The preferred grain size of the plate-like or rod-like, corundum or alumina-based compound structure ranges from 10 µm to 100 µm, while the preferred grain size of the fine granular corundum structure ranges from 1 µm to 10 µm. Inclusion of the plate- or rod-like, corundum or alumina-based compound structure in an amount of from 20% to 80% by volume can provide a high-toughness product which can exhibit a fracture toughness of at least 5.5 MPam$^{1/2}$. The structure which grows in a plate-like or rod-like form in the present invention is formed of corundum ($\alpha$-$Al_2O_3$) or an alumina-based compound. Where the additive is $TiO_2$ or $MnO_2$, for example, the structure is formed of corundum and, in some instances, $TiO_2$ and/or $MnO_2$ may remain. Where the additive is CaO, $B_2O_3$, $La_2O_3$, $Y_2O_3$, LiF or ZnO, crystals of the compound of $CaAl_{12}O_{19}$ ($CaO.6Al_2O_3$), $B_2Al_8O_{15}$ ($B_2O_3.4Al_2O_3$), $LaAl_{11}O_{15}$ ($LaO_3.11Al_2O_3$), $Y_3Al_5O_{12}$ ($2Y_2O_3.5Al_2O_3$), $LiAlO_2$ or $ZnAl_2O_4$ grow. Where the additive is MgO in the fine granular corundum structure, $MgAl_2O_4$ remains in the structure. Where the additive is $ZrO_2$, $ZrO_2$ remains in the structure. The inevitable impurities in the present invention are the additives still remaining in the structure and, primarily, reaction products of alumina and the additives, said reaction products still remaining in the structure.

In a second aspect of the present invention, there is also provided a process for the production of a sintered high-toughness alumina-based composite body, which comprises:

mixing a crystal-growth-promoting additive with a first portion of alumina powder to prepare a mix A;

mixing a crystal-growth-inhibiting additive with a second portion of alumina powder to prepare a mix B;

granulating at least one of the mix A and the mix B into granules;

mixing the mix A and the mix B into a mix C;

forming the mix C into a green body; and firing the green body, whereby crystals of the corundum or alumina-based compound in the mix A are allowed to grow.

According to the present invention, the plate-like or rod-like, corundum or alumina-based compound structure and the fine granular corundum structure form a mixed-phase structure so that the resulting sintered alumina-based composite body is dense and has excellent properties such as high strength and high toughness. Further, according to the production process of this invention, at least one of the mixes prepared in advance is granulated into granules. This facilitates control of the firing step and also control of the structure of the resulting sintered alumina-based composite body. The above-described, sintered alumina-based composite body having such excellent properties can therefore be produced readily.

BRIEF DESCRIPTION OF THE DRAWINGS

% $TiO_2$) to a mix B ($Al_2O_3$-10 wt. % YSZ), YSZ being ($ZrO_2$-3 mol % $Y_2O_3$)

DETAILED DESCRIPTION OF THE INVENTION AND PREFERRED EMBODIMENTS

Figure 1:
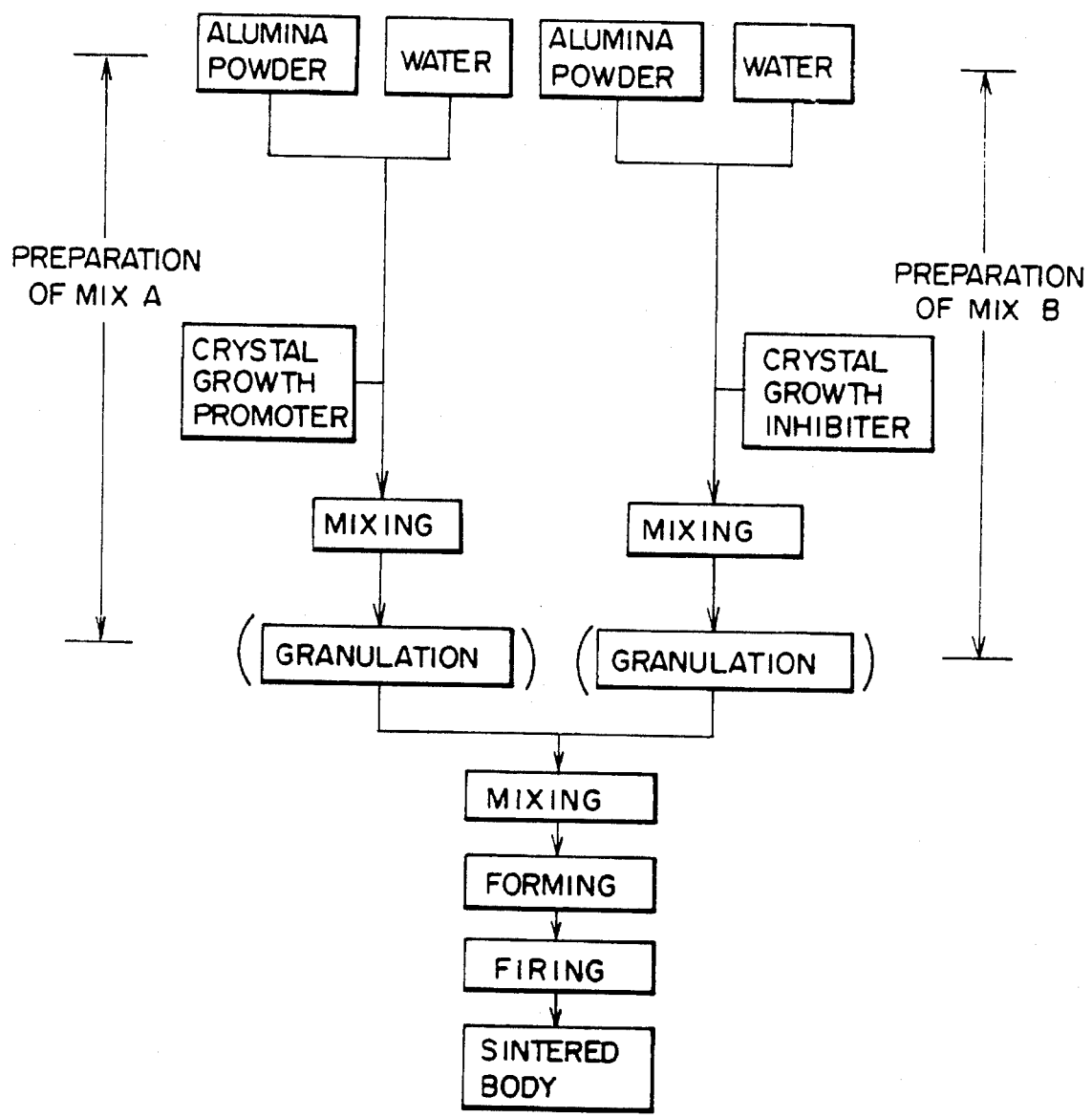
FIG. 1 is a flow chart of a production process according to the present invention.

The production process according to the present invention will hereinafter be described with reference to FIG. 1.

The mix A is employed to promote growth of crystals. This mix A is obtained by mixing alumina powder with water, adding a crystal growth-promoting additive to the resultant mixture and then mixing the mixture so obtained. The mix B, on the other hand, is used to inhibit growth of crystals. This mix B is obtained by mixing alumina powder with water, adding a crystal-growth-inhibiting additive to the resultant mixture and then mixing the mixture so obtained. One or both of the mixes A and B obtained as described above are granulated into granules. The mixes A and B, one being in a granulated form and the other in an un-granulated form or each being in a granulated form, are then mixed, shaped and fired, whereby a sintered composite body is obtained. The granulation steps are parenthesized in FIG. I because, as explained above, the production process requires granulation of at least one of the mixes.

As the crystal-growth-promoting additive (crystal growth promoter) used in the mix A, it is particularly effective to choose at least one of CaO, $TiO_2$, $B_2O_3$, ZnO, $MnO_2$, LiF, $Y_2O_3$ and $La_2O_3$. It is effective to add such an additive in an amount not greater than 10 wt. % based on the alumina powder. Amounts of the additive in excess of 10 wt. % result in the formation of a coarse single phase of the additive, followed by growth of this single phase. As a consequence, it is no longer possible to obtain a sintered body having high strength and high toughness. In addition, the additive forms a compound with alumina, thereby making it impossible to provide the resulting sintered body with high density, high strength and high toughness.

As the crystal-growth-inhibiting additive (crystal growth inhibitor), on the other hand, one of $ZrO_2$ and MgO is effective in particular. $ZrO_2$ may include $ZrO_2$ stabilized or partially stabilized with $Y_2O_3$. It is effective to add such an additive in an amount not greater than 30 wt. % based on the alumina powder. Addition of the crystal-growth-inhibiting additive in any amount greater than 30 wt. % cannot bring about any appreciable additional inhibiting effects so that, in the sintered alumina-based composite body, its addition beyond the above level is not needed.

It is effective to proportion the mix A and the mix B at a ratio of from 20:80 to 80:20 by weight percent. Addition of the mix A in a proportion greater than 80 wt. % promotes growth of crystals beyond a desired level, thereby making it impossible to attain the object of the present invention, that is, to provide the resulting sintered body with high density, high strength and high toughness. Amounts smaller than 20 wt. %, however, lead to a failure in obtaining a plate-like or rod-like alumina structure to an extent needed for the attainment of the above object of this invention.

In the production process of this invention, the structure can be controlled readily by adjusting the granule size of the mix A and/or the mix B and their mixing ratio. The granule size suited for the control of the structure, said control being to be conducted to achieve the object of the present invention, can range from 10 μm to 100 μm. Granule sizes smaller than 10 μm are not expected to bring about the effects which will otherwise be exhibited as a result of the granulation of at least one of the mixes into granules. Granule sizes greater than 100 μm, on the other hand, are too large to obtain a plate-like or rod-like corundum structure required for the attainment of the object of the present invention or to obtain crystals of a desired size.

The present invention will hereinafter be described specifically on the basis of the following example.

Example

Alumina powder whose average particle size had been adjusted to a submicron level was mixed with water, to which $TiO_2$ or $MnO_2$ was added as a crystal-growth-promoting additive (crystal growth promoter) in an amount of 1 wt. % based on the alumina powder. They were then mixed so that two types of mix A capable of allowing growth of crystals were prepared. On the side, alumina powder whose average particle size had been adjusted to a submicron level was mixed with water, followed by the addition of YSZ ($ZrO_2$-3 mol % $Y_2O_3$) as a crystal-growth-inhibiting additive (crystal growth inhibitor) in an amount of 10 wt. % on the basis of the alumina powder. The resulting mixture was mixed to prepare a mix B which serves to inhibit growth of crystals.

The mixes A and B so obtained were then separately granulated into granules. Those granules are proportioned as needed in a container. The resultant batch was shaped under low pressure and then fired at normal pressure.

In the manner described above, sintered alumina-based composite bodies of the following compositions were produced:

Test piece 1: [($Al_2O_3$-10 wt. % YSZ)-20 wt. % ($Al_2O_3$-1 wt. % $TiO_2$)]

Test piece 2: [($Al_2O_3$-10 wt. % YSZ)-20 wt. % ($Al_2O_3$-1 wt. % $MnO_2$)]

Test piece 3: [($Al_2O_3$-1 wt. % $TiO_2$)-30 wt. % ($Al_2O_3$-10 wt. % YSZ)]

As a comparative material, a sintered body made of ($Al_2O_3$-1 wt. % $TiO_2$) was also produced.

With respect to each of the test pieces and the comparative material, a relationship between firing temperature versus bulk density, a relationship between firing temperature and bending strength, and a relationship between firing temperature and fracture toughness were investigated. Incidentally, each bending strength was determined by the three-point bending test and each fracture toughness was determined based on a value measured by the SEPB method (single edge pre-cracked beam method).

Figure 2:
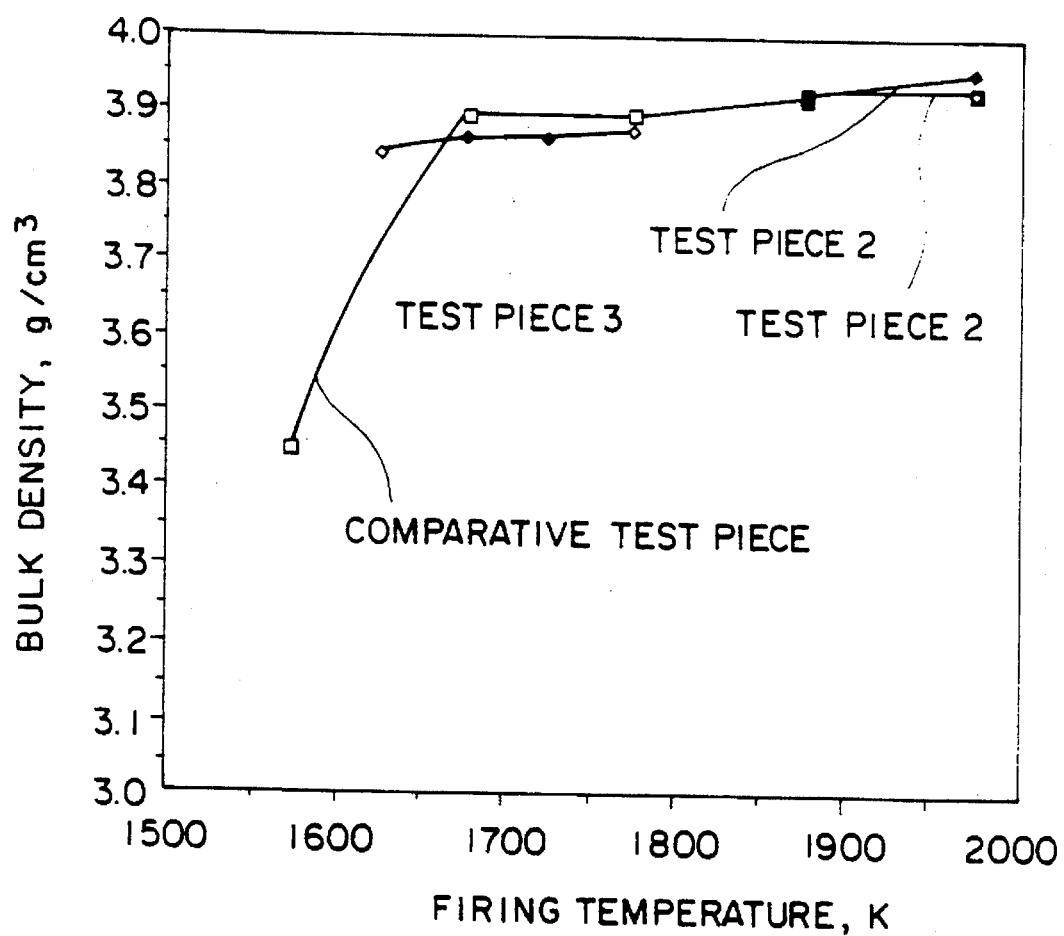
FIG. 2 is a graph showing a relationship between firing temperature versus bulk density of a product according to this invention and also that of a comparative material.
Figure 3:
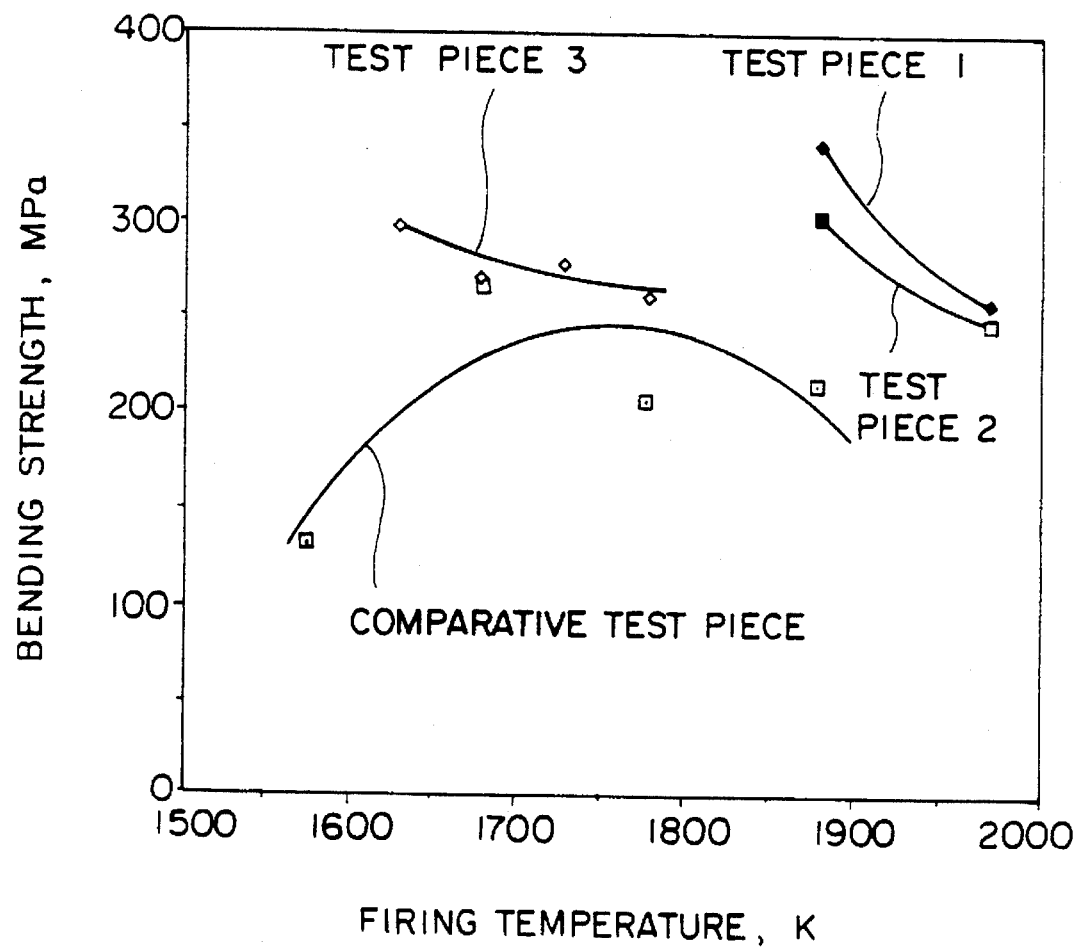
FIG. 3 is a graph showing a relationship between firing temperature versus bending strength of a product according to this invention and also that of a comparative material.
Figure 4:
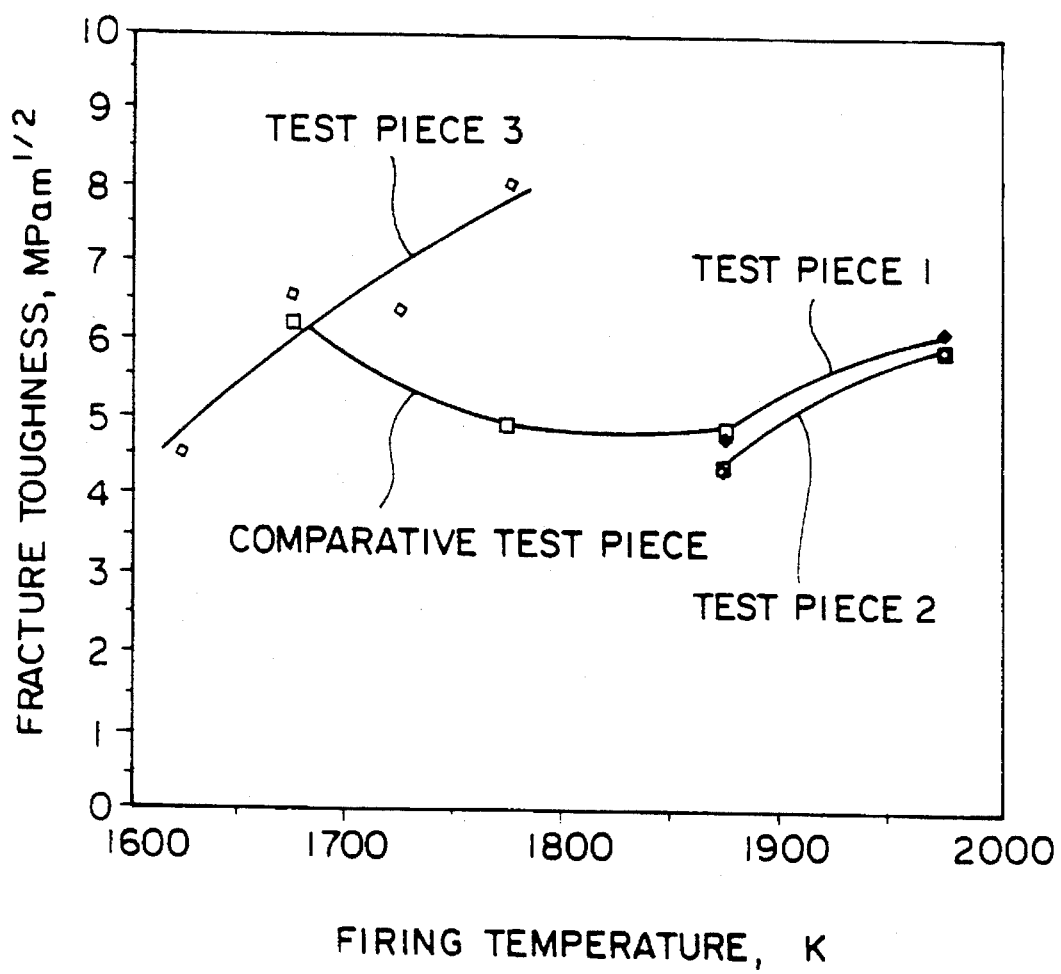
FIG. 4 is a graph showing a relationship between firing temperature versus fracture toughness of a product according to this invention and also that of a comparative material.

The results of those measurements are diagrammatically illustrated in FIG. 2, FIG. 3 and FIG. 4, respectively.

According to FIG. 2, the test pieces 1, 2 and 3 according to the present invention all show a bulk density as high as about 4 (g/cm$^3$). It is also appreciated that their bulk densities vary only a little even when the firing temperature is changed. Referring next to FIG. 3, the test pieces 1, 2 and 3 according to the present invention all show a bending strength as high as 300 (MPa). It is also envisaged that the bending strength remains at a value as high as 250–350 (MPa) at varied firing temperatures.

According to FIG. 4, the test pieces 1, 2 and 3 according to the present invention all show a higher fracture toughness as the firing temperature goes up. It is understood that a fracture toughness of 6 (MPam$^{1/2}$) or higher can be achieved depending on the firing temperature. Especially, the test piece 3 is found to exhibit an extremely good fracture toughness as high as 8 (MPam$^{1/2}$). In view of the fact that the fracture toughness of a sintered body formed of a single corundum-alumina phase is 3.5 (MPam$^{1/2}$), it is understood that sintered alumina-based composite bodies according to the present invention are particularly superior in fracture toughness.

In the above-described production method of this invention, the granules of both the mixes were shaped under low pressure and then fired at normal pressure. It is however readily conceivable in the present invention that the above characteristic values can be improved further by changing the firing temperature in two stages or by using the CIP (cold isostatic pressing), HIP (hot isostatic pressing) or the like.

The availability of the above-described excellent properties even by low-pressure shaping and normal-pressure firing especially demonstrates the usefulness of the production process.

Figure 5:
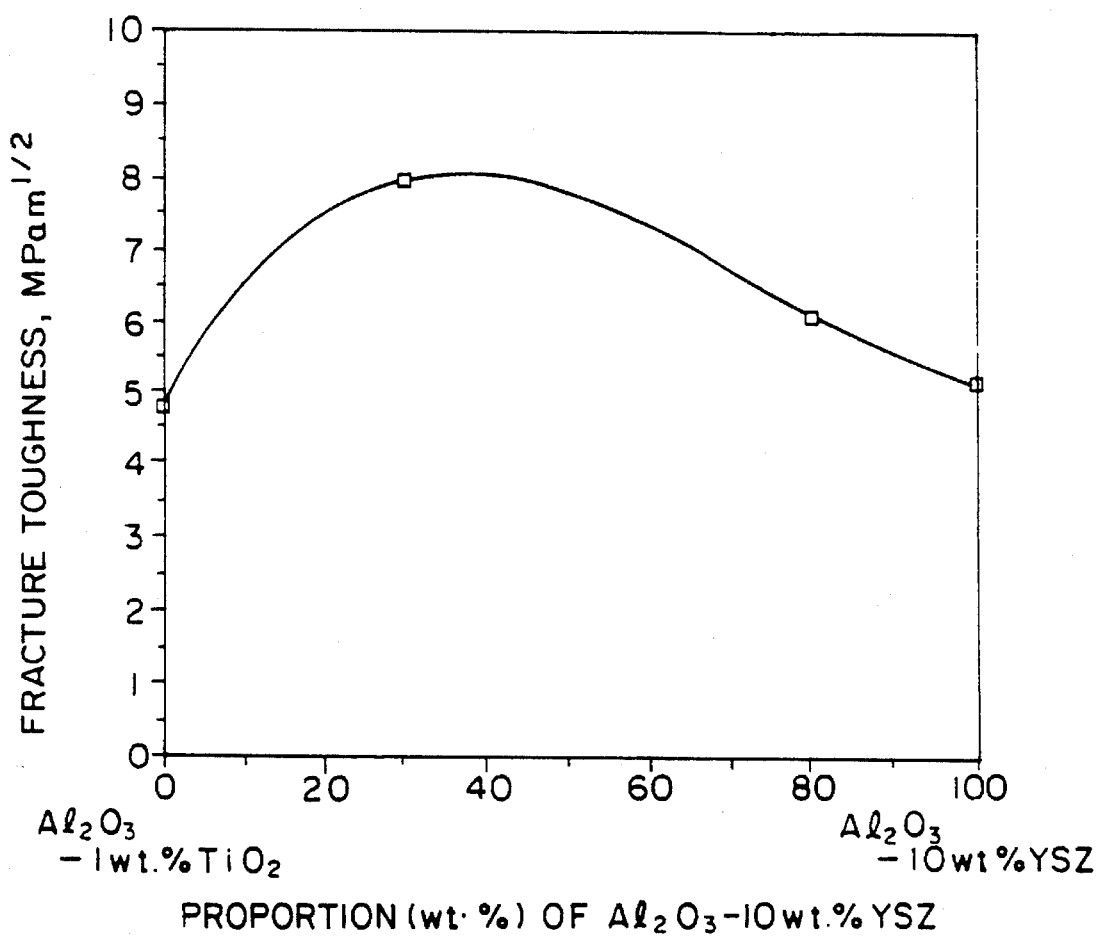
FIG. 5 is a graph illustrating variations in fracture toughness depending on the mixing ratio of a mix A ($Al_2O_3$-1 wt.

Further, variations in fracture toughness were also investigated at varied mixing ratios of (Al$_2$O$_3$-10 wt. % YSZ) granules and (Al$_2$O$_3$-1 wt. % TiO$_2$) granules. The results are diagrammatically illustrated in FIG. 5 in which mixing proportion is the proportion (wt. %) of the granules of Al$_2$O$_3$-10 wt. % YSZ "mix B". According to FIG. 5, it is envisaged that the fracture toughness abruptly increases, from a proportion of 20 wt. % of the mix A but abruptly decreases as the proportion of the mix A reaches about 80 wt. %. It is also understood that a fracture toughness of about 5.5 (MPam$^{1/2}$) or higher is shown when the mix A is added in a proportion of from 20 wt. % to 80 wt. %. In addition, the small variations in fracture toughness at proportions of the mix A smaller than 20 wt. % is believed to be attributable to a failure in obtaining a plate-like or rod-like corundum structure to a necessary extent. The small variations in fracture toughness in the range of proportions of the mix A in excess of 80 wt. % is considered to be attributable to growth of crystals beyond a necessary level, that is, joining of plural plate-like or rod-like structures into a coarse structure. These unduly small or large proportions of the mix A are hence not believed to bring about marked effects.

Figure 6:
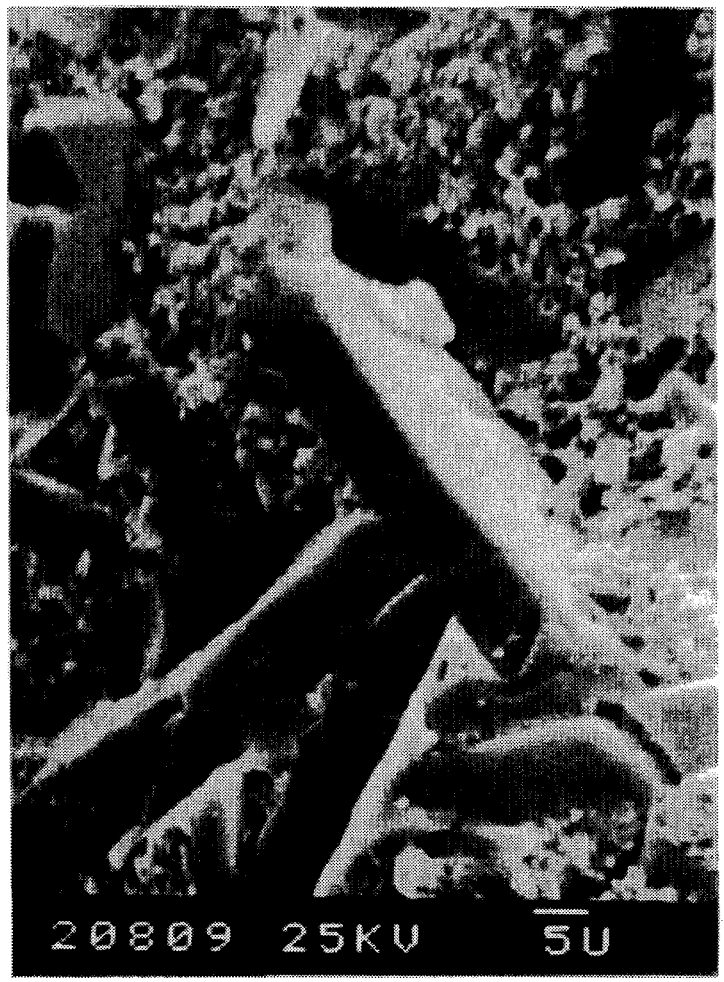
FIG. 6 is a scanning electron micrograph showing the microstructure of a test piece 3 according to the present invention.

Reference is finally had to FIG. 6, which is the scanning electron micrograph (SEM) showing the characteristic composite structure of the test piece 3. According to FIG. 6, it is envisaged that the test piece 3 is formed of a structure, in which plate- or rod-like grains have grown, and fine granular grains, and coarse plate-like or rod-like grains and fine granular grains are uniformly dispersed.

What is claimed is:

1. A sintered high-toughness alumina-based composite body of a structure consisting essentially of:

20 to 80 volume percent of a plate- or rod-shaped corundum structure or mixtures thereof;

a fine granular corundum structure; and inevitable impurities.

2. A sintered composite body of claim 1, wherein the plate- or rod-shaped corundum or mixtures thereof and the granular corundum structure are dispersed uniformly.

* * * * *